US012775780B2

(12) United States Patent
Zhou et al.

(10) Patent No.: US 12,775,780 B2
(45) Date of Patent: Oct. 27, 2026

(54) METHOD AND APPARATUS FOR REWRITING NARRATIVE TEXT, DEVICE, AND MEDIUM

(71) Applicants: Beijing Youzhuju Network Technology Co., Ltd., Beijing (CN); Fudan University, Shanghai (CN)

(72) Inventors: Hao Zhou, Beijing (CN); Jiangjie Chen, Beijing (CN); Chun Gan, Beijing (CN); Sijie Cheng, Beijing (CN); Yanghua Xiao, Beijing (CN); Lei Li, Beijing (CN)

(73) Assignees: Beijing Youzhuju Network Technology Co., Ltd., Beijing (CN); Fudan University, Shanghai (CN)

( * ) Notice: Subject to any disclaimer, the term of this patent is extended or adjusted under 35 U.S.C. 154(b) by 214 days.

(21) Appl. No.: 18/711,768

(22) PCT Filed: Nov. 16, 2022

(86) PCT No.: PCT/CN2022/132279
§ 371 (c)(1),
(2) Date: May 20, 2024

(87) PCT Pub. No.: WO2023/088309
PCT Pub. Date: May 25, 2023

(65) Prior Publication Data

US 2025/0053725 A1 Feb. 13, 2025

(30) Foreign Application Priority Data

Nov. 19, 2021 (CN) ......................... 202111400842.2

(51) Int. Cl.
*G06F 40/166* (2020.01)
*G06F 40/197* (2020.01)
*G06F 40/30* (2020.01)

(52) U.S. Cl.
CPC .......... *G06F 40/166* (2020.01); *G06F 40/197* (2020.01); *G06F 40/30* (2020.01)

(58) Field of Classification Search
CPC ...... G06F 40/166; G06F 40/197; G06F 40/30; G06F 40/253; G06F 40/211
See application file for complete search history.

(56) References Cited

U.S. PATENT DOCUMENTS

2007/0112819 A1* 5/2007 Dettinger ................ G06F 40/35
2017/0177716 A1* 6/2017 Perez ...................... G06F 40/30
(Continued)

FOREIGN PATENT DOCUMENTS

CN 109858004 A 6/2019
CN 111414736 A 7/2020
(Continued)

OTHER PUBLICATIONS

Hao, C., Pang, L., Lan, Y., Wang, Y., Guo, J., & Cheng, X. (May 2021). Sketch and customize: A counterfactual story generator. In Proceedings of the AAAI conference on artificial intelligence (vol. 35, No. 14, pp. 12955-12962). (Year: 2021).*
(Continued)

*Primary Examiner* — Philip H Lam
(74) *Attorney, Agent, or Firm* — BakerHostetler

(57) ABSTRACT

According to embodiments of the present disclosure, a method and apparatus for rewriting a narrative text, a device, and a medium are provided. The method includes determining a change to a sentence in a narrative text. An initial context of the sentence before the change is different from a target context of a changed sentence. The method further includes performing, based on inconsistency between a text part after the sentence in the narrative text and the target context, at least one edit operation on the text part to generate at least one edited version of the text part. The
(Continued)

method further includes replacing the text part with an edited version in the at least one edited version to obtain a rewritten narrative text. In this way, the narrative text can be rewritten with a small number of edits while ensuring contextual coherence.

18 Claims, 7 Drawing Sheets

(56) References Cited

U.S. PATENT DOCUMENTS

| | | | | |
|---|---|---|---|---|
| 2019/0251150 | A1* | 8/2019 | Vinay | G06F 8/38 |
| 2019/0272325 | A1 | 9/2019 | Korn | |
| 2020/0302011 | A1* | 9/2020 | Mishra | G06F 40/242 |
| 2021/0043194 | A1* | 2/2021 | Krishnamurthy | G10L 15/22 |
| 2021/0117625 | A1* | 4/2021 | Gao | G06N 3/02 |
| 2021/0157551 | A1* | 5/2021 | Bliss | G06F 8/20 |
| 2021/0342548 | A1 | 11/2021 | Galitsky | |
| 2022/0215184 | A1* | 7/2022 | Freitag | G06F 40/30 |

FOREIGN PATENT DOCUMENTS

| | | | |
|---|---|---|---|
| CN | 111737961 | A | 10/2020 |
| CN | 111783422 | A | 10/2020 |
| CN | 112084304 | A | 12/2020 |
| CN | 113569539 | A | 10/2021 |
| CN | 113609824 | A | 11/2021 |
| CN | 114091414 | A | 2/2022 |
| JP | 2018-036871 | A | 3/2018 |

OTHER PUBLICATIONS

Qin, L., Bosselut, A., Holtzman, A., Bhagavatula, C., Clark, E., & Choi, Y. (2019). Counterfactual story reasoning and generation. arXiv preprint arXiv:1909.04076. (Year: 2019).*

International Patent Application No. PCT/CN2022/132279; Int'l Search Report; dated Jan. 20, 2023; 2 pages.

First Office Action for Chinese Application No. 202111400842.2, mailed on Jan. 26, 2025, 13 pages.

Hao C., et al., "Sketch and Customize: A Counterfactual Story Generator," arXiv, Apr. 2, 2021, arXiv:2104.00929v1, 8 pages.

* cited by examiner

METHOD AND APPARATUS FOR REWRITING NARRATIVE TEXT, DEVICE, AND MEDIUM

CROSS REFERENCE TO RELATED APPLICATIONS

This application is a national stage application filed under 35 U.S.C. 371 based on International Patent Application No. PCT/CN2022/132279, filed on Nov. 16, 2022, which claims priority to CN application Ser. No. 202111400842.2, filed on Nov. 19, 2021, and entitled "METHOD AND APPARATUS FOR REWRITING NARRATIVE TEXT, DEVICE, AND MEDIUM", the disclosures of which are incorporated herein by reference in their entities.

TECHNICAL FIELD

Example embodiments of the present disclosure generally relate to the field of computers, and in particular, to a method and apparatus for rewriting a narrative text, a device, and a computer-readable storage medium.

BACKGROUND ART

A narrative text (for example, a story or a narrative) is used to describe a coherent and logical sequence of plots. The story is used as an example. When an antecedent condition in the story changes, a result that may arise from a new condition needs to be inferred. In other words, an ending of the story under the new condition needs to be inferred. It is easy for a person to write a coherent ending of the story under the new condition. However, it is challenging for a machine such as a computing device to generate the coherent ending of the story under the new condition with a small number of changes made to the original story.

SUMMARY OF THE INVENTION

According to an example embodiment of the present disclosure, there is provided a solution for rewriting a narrative text.

According to a first aspect of the present disclosure, there is provided a method for rewriting a narrative text, where the method includes determining a change to a sentence in the narrative text, where an initial context of the sentence before the change is different from a target context of a changed sentence. The method further includes performing, based on inconsistency between a text part after the sentence in the narrative text and the target context, at least one edit operation on the text part to generate at least one edited version of the text part. The method further includes replacing the text part with an edited version in the at least one edited version to obtain a rewritten narrative text.

According to a second aspect of the present disclosure, there is provided an electronic device. The device includes at least one processing unit and at least one memory. The at least one memory is coupled to the at least one processing unit, and stores instructions executable by the at least one processing unit. The instructions, when executed by the at least one processing unit, cause the device to perform the following actions: determining a change to a sentence in the narrative text, where an initial context of the sentence before the change is different from a target context of a changed sentence; performing, based on inconsistency between a text part after the sentence in the narrative text and the target context, at least one edit operation on the text part to generate at least one edited version of the text part; and replacing the text part with an edited version in the at least one edited version to obtain a rewritten narrative text.

According to a third aspect of the present disclosure, there is provided an apparatus for rewriting a narrative text, where the apparatus includes: a change determining module configured to determine a change to a sentence in the narrative text, where an initial context of the sentence before the change is different from a target context of a changed sentence; an editing module configured to perform, based on inconsistency between a text part after the sentence in the narrative text and the target context, at least one edit operation on the text part to generate at least one edited version of the text part; and a replacement module configured to replace the text part with an edited version in the at least one edited version to obtain a rewritten narrative text.

According to a fourth aspect of the present disclosure, there is provided a computer-readable storage medium. The medium stores a computer program. The program, when executed by a processor, causes the method according to the first aspect to be implemented.

It should be understood that content described in the content part of the present disclosure is not intended to limit key features or important features of the embodiments of the present disclosure, and is also not intended to limit the scope of the present disclosure. Other features of the present disclosure become easy to understand through the following descriptions.

BRIEF DESCRIPTION OF DRAWINGS

The foregoing and other features, advantages and aspects of embodiments of the present disclosure become more apparent with reference to the following detailed description and in conjunction with the accompanying drawings. In the drawings, the same or similar reference numerals denote the same or similar elements.

DETAILED DESCRIPTION OF THE INVENTION

Figure 1:
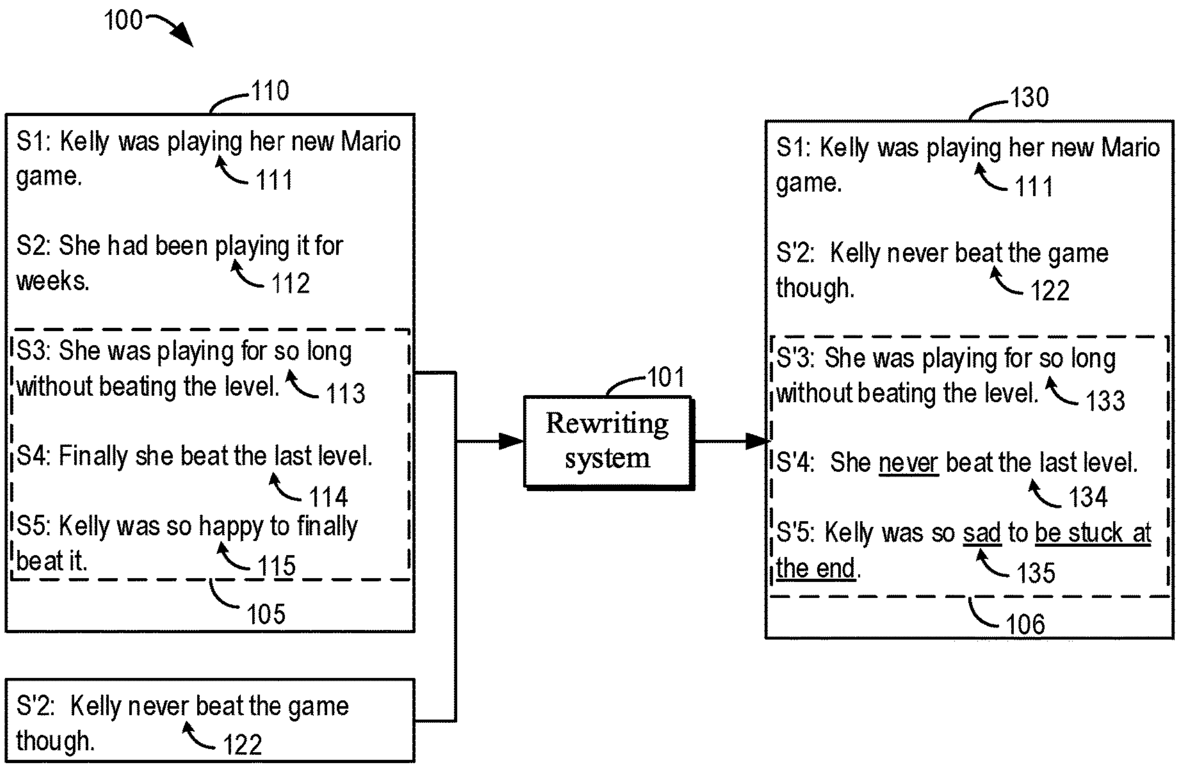
FIG. 1 is a schematic diagram of an example environment in which the embodiments of the present disclosure can be implemented.

Embodiments of the present disclosure are described in more detail below with reference to the accompanying drawings. Although some embodiments of the present disclosure are shown in the accompanying drawings, it should be understood that the present disclosure may be implemented in various forms and should not be construed as being limited to the embodiments set forth herein. Rather, these embodiments are provided for a more thorough and complete understanding of the present disclosure. It should be understood that the accompanying drawings and the embodiments of the present disclosure are only for exemplary purposes, and are not intended to limit the scope of protection of the present disclosure.

In the description of the embodiments of the present disclosure, the term “comprise” and similar terms should be understood as open-ended inclusion, namely “including but not limited to”. The term “based on” should be understood as “at least partially based on”. The term “an embodiment” or “the embodiment” should be understood as “at least one embodiment”. The term “some embodiments” should be understood as “at least some embodiments”. Other explicit and implicit definitions may be included below.

As used herein, the term “language model” refers to a model that can learn a corresponding association between an input and an output from training data for a natural language processing task, so that after training is completed, the model can generate a corresponding output for a specific input. The language model may be generated based on a machine learning technology. Deep learning is a machine learning algorithm, which processes an input and provides a corresponding output using a plurality of layers of processing units. A neural network model is an example of a model based on deep learning.

As used herein, the term “text element” refers to a unit processed in a natural language processing task, and a granularity of the text element may be changed and set based on an application scenario. For example, the text element may include a word, a subword, a phrase, a symbol, a combination thereof, or any other unit appearing in a natural language expression. The “subword” is generally obtained by splitting the “word”. For example, the word “duration” may be split into a subword “dura” and a subword “tion”. During processing, the text element may be represented as a token. In the present disclosure, the text element and the token are used interchangeably.

As briefly mentioned above, when an antecedent condition in a story changes, an ending of the story under a new condition needs to be inferred. Autoregression is used in most conventional machine-based story generation or story rewriting solutions. A pre-trained language model is mainly used in these solutions.

In most of the conventional solutions, a language modeling capability of the language model is used to keep the story logical. Through such solutions, a coherent ending of the story under the new condition can be generated, but the original story needs to be modified greatly. In a few of conventional solutions, decoding of a new ending of the story is restricted by a sentence-level similarity with the original story. However, since the language model is difficult to control, such conventional solutions may still lead to overediting. The foregoing uses the story as an example to describe problems of the conventional solutions in story rewriting, and there are similar problems for other types of narrative texts.

According to the embodiments of the present disclosure, a solution for rewriting a narrative text is provided. According to this solution, based on a context of a changed condition in a narrative text, at least one edit operation is performed on a text part after the condition. In this way, at least one edited version of the text part (for example, a story ending) is obtained. One of the edited version is selected to replace the original text part, so that a rewritten narrative text is output.

In this solution, the changed context is considered, so that a text element conflicting with the changed context can be located and edited, and it is ensured that an edited text element does not conflict with the changed context. This is an editing-based unsupervised narrative text rewriting solution. In this way, a balance is made between narration coherence and a number of edits. Therefore, according to the embodiments of the present disclosure, the narrative text can be rewritten with a small number of edits while ensuring contextual coherence.

Various example implementations of this solution are further described below in detail with reference to the accompanying drawings.

Example Environment

FIG. 1 is a schematic diagram of an example environment 100 in which the embodiments of the present disclosure can be implemented. In the example environment 100, a rewriting system 101 is configured to rewrite a narrative text based on a changed condition.

The rewriting system 101 obtains a narrative text 110, e.g., a story, including a plurality of sentences. Merely as an example, the narrative text 110 in FIG. 1 includes five sentences: an S1 sentence 111, an S2 sentence 112, an S3 sentence 113, an S4 sentence 114, and an S5 sentence 115.

The rewriting system 101 further obtains a change to a sentence in the narrative text 110, or a changed sentence. In the example in FIG. 1, the S2 sentence 112 in the narrative text is changed to an S'2 sentence 122. It can be learned from FIG. 1 that a context of the S2 sentence 112 is different from that of the S'2 sentence 122. In this specification, a context of the sentence before the change is also referred to as an “initial context”, and a context of the changed sentence is also referred to as a “target context” or a “changed context”.

In this case, the rewriting system 101 edits an ending part 105 after the S2 sentence 112 in the narrative text 101 based on a context of the S'2 sentence 122, such that an edited ending part is consistent with the changed context. In this specification, the terms “ending part”, “ending”, and “text part” are used interchangeably. Editing the ending part or a similar expression means editing one or more text elements in the ending part, and some original text elements may remain unchanged.

The rewriting system 101 outputs a rewritten narrative text 130. The narrative text 130 includes the original S1 sentence 111, the S'2 sentence 122, and a rewritten ending part 106. The ending part 106 corresponds to the ending part 105, and includes an S'3 sentence 133, an S'4 sentence 134, and an S'5 sentence 135. In FIG. 1, text elements added or changed relative to the initial narrative text 110 are underlined, only for the purposes of describing and understanding the present disclosure.

In FIG. 1, the rewriting system 101 may be any system with a computing capability, for example, various computing devices/systems, terminal devices, or servers. The terminal device may be any type of mobile terminal, fixed terminal, or portable terminal, including a mobile phone, a desktop computer, a laptop computer, a notebook computer, a netbook computer, a tablet computer, a media computer, a multimedia tablet, or any combination thereof, including fittings and peripherals of these devices or any combination thereof. The server includes but is not limited to a mainframe, an edge computing node, a computing device in a cloud environment, and the like.

It should be understood that the components and the arrangement in the environment shown in FIG. 1 are merely examples, and a computing system suitable for implementing the example embodiments described in the present disclosure may include one or more different components, other components, and/or different arrangement manners. In addition, a number and a language of the sentences included in the narrative text shown in FIG. 1 are merely examples and not intended to limit the scope of the present disclosure. The embodiments of the present disclosure are applicable to a narrative text including any appropriate number of sentences in any language.

Expression of a Text Rewriting Task

To better understand the text rewriting solution according to the embodiments of the present disclosure, a causal model may be used to express the text rewriting task described above. The causal model is a directed acyclic graph used to encode an assumption about a data generation process.

Figure 2:
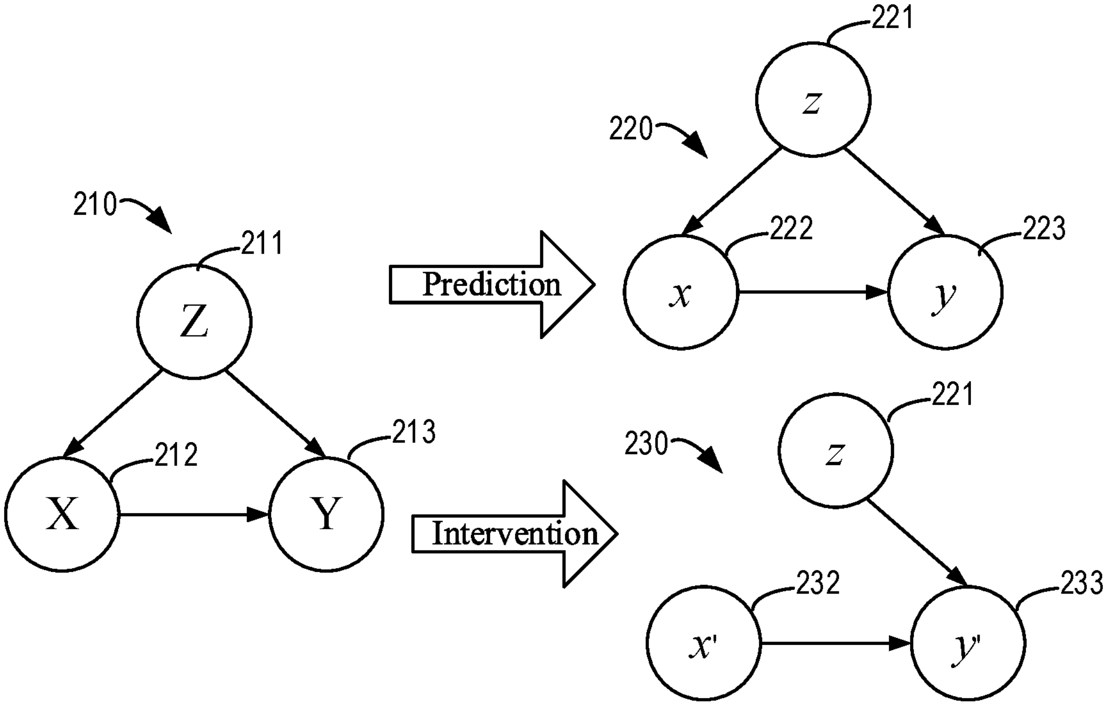
FIG. 2 is a schematic diagram of expressing a text rewriting task according to some embodiments of the present disclosure.

FIG. 2 is a schematic diagram of the expression of the text rewriting task according to some embodiments of the present disclosure. A view 210 in FIG. 2 shows a simple example of the causal model. The causal model includes a confounding factor Z 211, a treatment X 212, and an effect Y 213. In causal inference, the confounding factor Z 211 is a random variable that affects a treatment variable and an effect variable.

A view 220 shows an example of expressing the narrative text 110 using the causal model. The narrative text 110 may include an antecedent z 221, a context x 222, and an ending y 223. In the text rewriting task, the antecedent z 221 includes not only the S1 sentence 111 that can be observed but also common-sense knowledge that cannot be observed and is difficult to model.

A view 230 shows an example representation of the text rewriting task generated by applying intervention (that is, counterfactual interference) to the X variable in the causal model. A do operator may be used to represent the counterfactual interference applied. do(X)=x' is applied to set a value of X to the changed context, with other parts unchanged. Therefore, the changed context or the target context may be regarded as a counterfactual context.

Since X no longer depends on Z after the intervention, an arrow from the antecedent z 221 to a context x' 222 is deleted in the view 230. Accordingly, the text rewriting task may be expressed as predicting a new ending y' 223 when the antecedent z 221 remains unchanged and the context x 222 is changed to the context x' 222.

For such a text rewriting task, it is challenging to quantize text rewriting quality, that is, to evaluate, using a machine, whether a rewritten ending is coherent. In some embodiments, a difference between quality of endings under different conditions may be quantized by a causal risk ratio (CRR). The CRR is defined as:

$$CRR = \frac{P(Y = y \mid do(X) = x', Z = z)}{P(Y = y \mid do(X) = x, Z = z)} \quad (1)$$

where if the rewritten ending is more consistent with the changed context, a value of the CRR is greater.

However, it is actually difficult to explicitly compute confounding factors that can be observed and cannot be observed in P(Y=$y$|do(X)=x), as shown in formula (2):

$$\frac{P(Y=y \mid do(X)=x)}{\sum_{z^*} P(Y = y \mid X = x, Z = z^*)P(Z = z^*)} \quad (2)$$

where $z^*$ represents the confounding factors that can be observed and cannot be observed.

Therefore, causal sufficiency assumption may be performed, that is, only the confounding factor that can be observed is considered, as shown in formula (3):

$$P(Y = y \mid do(X) = x) = P(Y = y \mid X = x, Z = z) \quad (3)$$

where z represents the confounding factor that can be observed.

In this assumption, the CRR may be computed by formula (4):

$$CRR = \frac{P(Y = y \mid X = x', Z = z)}{P(Y = y \mid X = x, Z = z)} \quad (4)$$

The following describes in detail use of the concept of the CRR during evaluation of the text rewriting quality.

Text Rewriting Architecture

Figure 3:
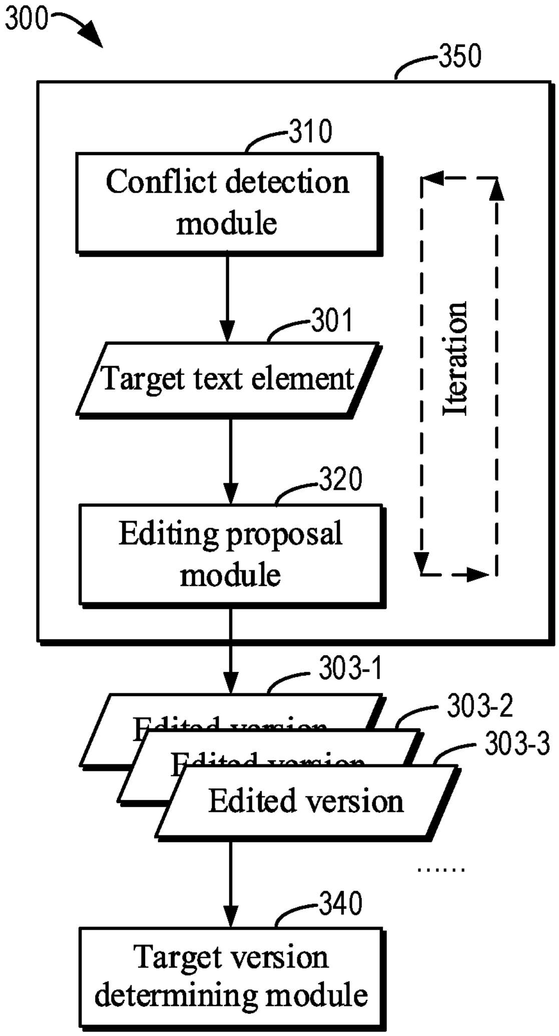
FIG. 3 shows an example of a text rewriting architecture according to some embodiments of the present disclosure.

FIG. 3 shows an example of a text rewriting architecture 300 according to some embodiments of the present disclosure. The architecture 300 in FIG. 3 may be implemented in the rewriting system 101 in FIG. 1. Each module in the architecture 300 may be implemented by hardware, software, firmware, or any combination thereof. The following describes example operations of the architecture 300 with reference to FIG. 1.

The architecture 300 includes an edited version generation module 350. The edited version generation module 350 is configured to perform an edit operation on the ending part 105 based on inconsistency between the ending part 105 and the changed context, to generate at least one edited version of the ending part 105. FIG. 3 shows a plurality of edited versions 303-1, 303-2, and 303-3, which are also collectively or separately referred to as edited versions 303. As used herein, the inconsistency with the changed context includes a conflict or contradiction with the changed context. In addition, the ending part may be an original ending part or an ending part of the edited version.

As shown in FIG. 3, the edited version generation module 350 may further include a conflict detection module 310 and an editing proposal module 320. The conflict detection module 310 is configured to identify, in the ending part 105 of a current version based on the changed context, a target text element 301 to be edited. In other words, the conflict detection module 310 identifies, in the ending part 105 of the current version, a text element contradicting the changed context as the target text element 301. For example, the conflict detection module 310 may identify, in the ending part 105 of the current version, a word contradicting the changed context.

The editing proposal module 320 is configured to perform an edit operation on the target text element 301 to generate the edited version 303. The edit operation may include but is not limited to: a replace operation of replacing the target text element 301 with another text element, a delete operation of deleting the target text element 301, and an insert operation of inserting a text element before or after the target text element 301.

The editing proposal module 320 may perform one of the edit operations described above, for example, randomly perform a specific edit operation, on the target text element 301. Therefore, a candidate edited version may be obtained.

In some embodiments, the editing proposal module 320 may filter the candidate edited version. For example, the editing proposal module 320 may determine an acceptance rate of the candidate edited version at least based on a contextual coherence score of the candidate edited version. The acceptance rate indicates a probability that the candidate edited version is accepted. In some embodiments, the editing proposal module 320 may further determine the acceptance rate of the candidate edited version based on another additional factor. This is described in detail below.

A candidate edited version whose acceptance rate exceeds a threshold is accepted, that is, determined as one of the edited versions 303. A candidate edited version whose acceptance rate does not exceed the threshold is discarded.

In some embodiments, as shown in FIG. 3, the operations of the conflict detection module 310 and the editing proposal module 320 are iteratively performed, so that the plurality of edited versions 303 are generated. An edited version 303 generated through a current round of iteration is used as the current version of the ending part 105 in a next round of iteration. If the candidate edited version generated through the current round of iteration is rejected, that is, no new edited version is generated in the current round of iteration, an edited version 303 last generated is used as the current version of the ending part 105 in the next round of iteration.

Figure 4:
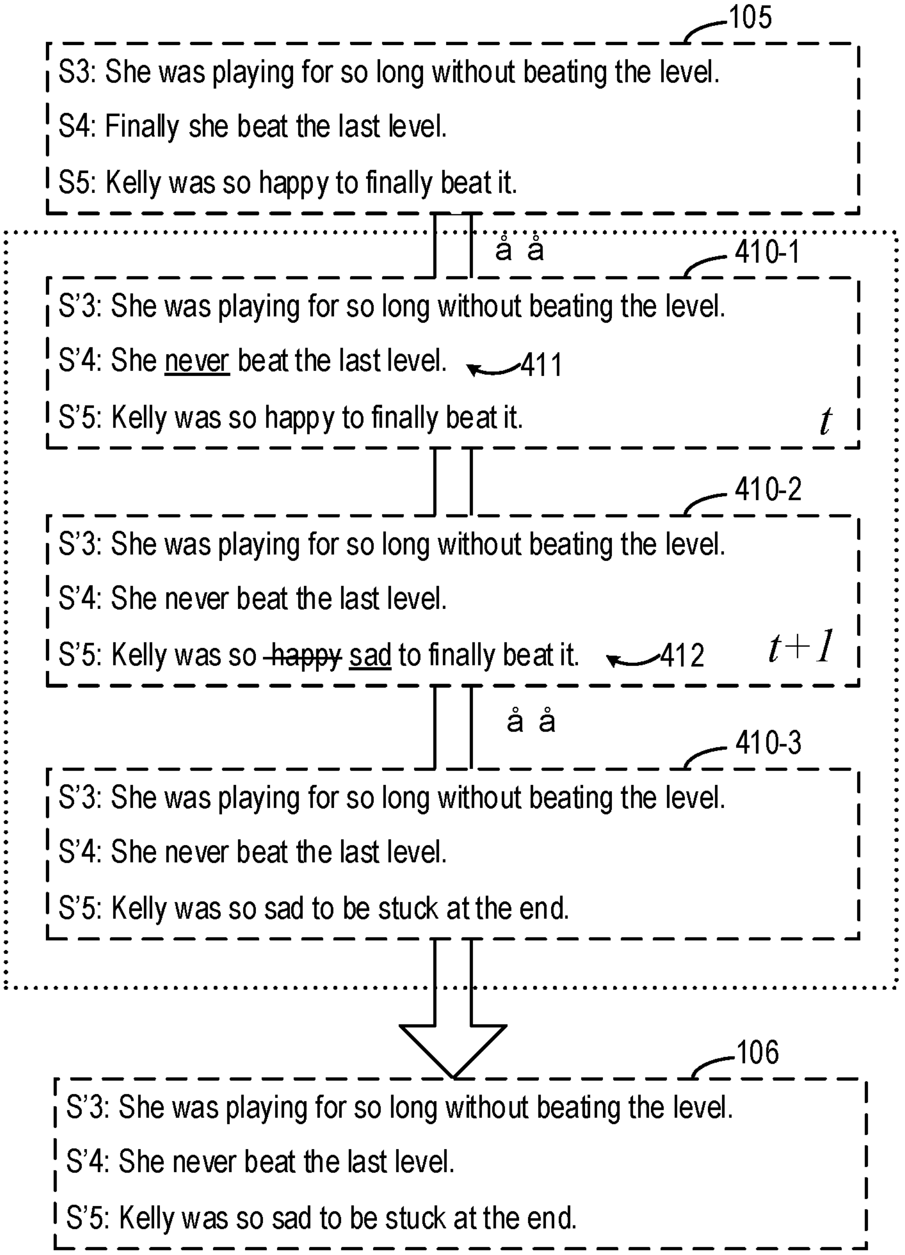
FIG. 4 shows an example of an edited version generated through iteration according to some embodiments of the present disclosure.

Referring to FIG. 4 now, FIG. 4 shows edited versions 410-1, 420-2, and 410-3 of the ending part 105 generated through iteration. The edited version 410-1 is generated in a $t^{th}$ round of iteration, and thus is used as the current version of the ending part 105 in a $(t+1)^{th}$ round of iteration. In other words, in the $(t+1)^{th}$ round of iteration, the conflict detection module 310 identifies the target text element 301 in the edited version 410-1. In the example in FIG. 4, in the (t+1)th round of iteration, the word "happy" in an S'5 sentence 412 is identified as the target text element 301, and a replace operation is performed on the word "happy".

Continuing to refer to FIG. 3, the operations of the conflict detection module 310 and the editing proposal module 320 are iteratively performed until a predetermined number of rounds are performed or until the conflict detection module 310 cannot identify a target text element in the ending part 105 of the current version. Therefore, the edited version generation module 350 generates the edited version 303.

The operations of the conflict detection module 310 and the editing proposal module 320 may be iteratively performed based on a Markov Chain Monte Carlo (MCMC) sampling process. In the MCMC sampling process, after the target text element to be edited is determined, that is, after an editing position is determined, an edit operation to be performed is selected from the replace, insert, and delete operations at a same probability. Then, whether the obtained candidate edited version is accepted is determined based on the acceptance rate of the candidate edited version.

Alternatively, in some embodiments, the conflict detection module 310 may identify a plurality of target text elements 301 to be edited in the ending part 105, to generate the plurality of edited versions 303. Alternatively or additionally, in some embodiments, the editing proposal module 320 may propose a plurality of edit operations for the target text element 301, so as to generate the plurality of edited versions 303.

The architecture 300 further includes a target version determining module 340. The target version determining module 340 is configured to replace the ending part 105 with one of the edited versions 303 to obtain the rewritten narrative text 130.

When the plurality of edited versions 303 are generated, the target version determining module 340 may perform selection from the plurality of edited versions 303. Specifically, the target version determining module 340 may determine expected attributes for the plurality of edited versions 303, respectively. The attribute of each edited version 303 is related to at least contextual coherence of the edited version 303, for example, is proportional to a contextual coherence score. Additionally, in some embodiments, the attribute of each edited version 303 may also be related to language fluency of the edited version 303, for example, is proportional to a language fluency score.

The target version determining module 340 may then select a target version for replacing the ending part 105 from the plurality of edited versions 303 based on the attribute of each of the plurality of edited versions 303. An edited version 303 with an optimal attribute may be selected as the target version. For example, the plurality of edited versions 303 may be ranked based on the attributes, and the edited version ranked highest is selected as the target version. In the example in FIG. 4, the edited version 410-3 is selected as the target version to replace the ending part 105.

The foregoing describes, with reference to the architecture 300 in FIG. 3, overall operations for text rewriting according to the embodiments of the present disclosure. The following mainly describes example operations for conflict detection, editing proposal, and target version determining in detail using iterative implementation as an example.

Conflict Detection

As mentioned above with reference to FIG. 3, the conflict detection module 310 identifies, in the ending part 105 of the current version, the text element contradicting the changed context as the target text element 301. Specifically, the conflict detection module 310 may determine a causal conflict degree between each text element in the ending part 105 of the current version and the changed context. The conflict detection module 310 may select the target text element 301 based on the respective conflict degrees of these text elements. The conflict degree of the target text element 301 is higher than that of a text element not selected. For example, the conflict degree of the target text element 301 is the highest.

The text element conflicting with the changed context is identified, so that a causal variable can be located and modified. In addition, causal invariable information is retained in a text element not identified. In this way, the ending part 105 may be rewritten with a minimum number of edits.

In some embodiments, for each text element in the ending part 105 of the current version, a correlation (also referred to as a "first correlation") between the text element and the changed context and a correlation (also referred to as a "second correlation") between the text element and the initial context may be determined using a pre-trained language model. Further, a conflict degree between the text element and the changed context may be determined based on the first correlation and the second correlation.

As an example, in view of the CRR described above, an inconsistency degree between the text element and the changed context may be evaluated in a similar manner. Similar to formula (4), the conflict degree of the text element may be computed through the following formula (5):

$$P_{cf}(y_i^*) = \text{softmax}\left(\frac{P_{LM}(y_i^*|z, x, y_{<i}^*)}{P_{LM}(y_i^*|z, x', y_{<i}^*)}\right) \quad (5)$$

where $y^*$ represents the ending part 105 of the current version, $y_i^*$ represents an $i^{th}$ text element in the ending part 105 of the current version, $y_{<i}^*$ represents a text element before the $i^{th}$ text element in the ending part 105 of the current version, $z$ represents the S1 sentence 111, $x$ represents the S2 sentence 112, $x'$ represents the S'2 sentence 122, $P_{LM}$ represents a probability obtained using any appropriate language model, and $P_{cf}(y_i^*)$ represents a conflict degree of the $i^{th}$ text element.

The term $P_{LM}(y_i^* | z, x, y_{<i}^*)$ in formula (5) represents a probability of occurrence of the $i^{th}$ text element when the S1 sentence 111, the S2 sentence 112, and the text element before the $i^{th}$ text element are specified. Therefore, the term $P_{LM}(y_i^* | z, x, y_{<i}^*)$ may represent a correlation between the $i^{th}$ text element and the initial context. If this value is greater, it indicates that the $i^{th}$ text element is more correlated with the initial context.

The term $P_{LM}(y_i^* | z, x', y_{<i}^*)$ in formula (5) represents a probability of occurrence of the $i^{th}$ text element when the S1 sentence 111, the S'2 sentence 122, and the text element before the $i^{th}$ text element are specified. Therefore, the term $P_{LM}(y_i^* | z, x', y_{<i}^*)$ may represent a correlation between the $i^{th}$ text element and the changed context. If this value is greater, it indicates that the $i^{th}$ text element is more correlated with the changed context.

Accordingly, if a value of $P_{cf}(y_i^*)$ is greater, the $i^{th}$ text element is more causally correlated with the initial context than the changed context. In other words, a text element with a larger value of $P_{cf}(y_i^*)$ is more likely to contradict the changed context, and is a text element to be preferably edited.

The conflict detection module 310 may determine the target text element 301 based on the conflict degree $P_{cf}(y_i^*)$. For example, in an iteration embodiment, the conflict detection module 310 may determine a text element with the largest value of $P_{cf}(y_i^*)$ as the target text element 301 in each round of iteration. For another example, in a non-iteration embodiment, the conflict detection module 310 may determine first k text elements (k is an integer greater than or equal to 1) with the largest values of $P_{cf}(y_i^*)$ as the target text elements 301.

In such embodiments, the correlations with both the initial context and the changed context are considered, so that a text element that needs more to be edited can be accurately located. This can further help reduce the number of edits and ensure narration coherence.

Alternatively, in some embodiments, a conflict degree between a text element and the changed context may be determined based on a correlation between the text element and the changed context. For example, the conflict degree of the $i^{th}$ text element may be determined based on the term $P_{LM}(y_i^* | z, x', y_{<i}^*)$ in formula (5). A smaller value of $P_{LM}(y_i^* | z, x', y_{<i}^*)$ indicates a higher conflict degree between the $i^{th}$ text element and the changed context.

Editing Proposal

The target text element 301 to be edited may be determined through conflict detection. The editing proposal module 320 performs one of predetermined edit operations, for example, randomly performs a specific edit operation, on the target text element 301 to obtain the candidate edited version. The predetermined edit operations may include but are not limited to the replace operation, the delete operation, and the insert operation.

In the example in FIG. 4, in the $i^{th}$ round of iteration, the word "beat" in the S'4 sentence 411 is identified as the target text element 301, and an insert operation is performed on the word "beat", that is, the word "never" is inserted before the word "beat". In the $(t+1)^{th}$ round of iteration, the word "happy" in the S'5 sentence 412 is identified as the target text element 301, and a replace operation is performed on the word "happy", that is, the word "happy" is replaced with the word "sad".

As briefly mentioned with reference to FIG. 3, in some embodiments, the editing proposal module 320 may filter the candidate edited version based on the acceptance rate of the candidate edited version. The acceptance rate depends on at least the causal contextual coherence score of the candidate edited version. Accordingly, the editing proposal module 320 may determine the contextual coherence score based on a correlation between the candidate edited version and the changed context and a correlation between the candidate edited version and the initial context. The contextual coherence score may be determined using the language model.

As an example, in view of the CRR described above, contextual coherence of the candidate edited version may be evaluated in a similar manner. Similar to formula (4), the contextual coherence score of the candidate edited version may be computed through the following formula (6):

$$\chi_{Coh}(y^*) = \frac{P_{Coh}(Y = y^* | z, x')}{P_{Coh}(Y = y^* | z, x)} \quad (6)$$

where $y^*$ represents the candidate edited version, $z$ represents the S1 sentence 111, $x$ represents the S2 sentence 112, $x'$ represents the S'2 sentence 122, $P_{Coh}$ represents a conditional probability obtained using any appropriate language model, and $\chi_{Coh}$ represents the contextual consistency score.

The term $P_{Coh}(Y=y^* | z, x)$ in formula (6) represents a probability of generating the candidate edited version when the S1 sentence 111 and the S'2 sentence 122 are specified. Therefore, the term $P_{Coh}(Y=y^* | z, x')$ may represent a correlation between the candidate edited version and the changed context.

The term $P_{Coh}(Y=y^* | z, x)$ in formula (6) represents a probability of generating the candidate edited version when the S1 sentence 111 and the S2 sentence 112 are specified. Therefore, the term $P_{Coh}(Y=y^* | z, x)$ may represent the correlation between the candidate edited version initial context.

Accordingly, if a value of $\mathcal{X}P_{Coh}$ is greater, the candidate edited version is more causally correlated with the changed context than the initial context. In other words, a candidate edited version with a larger value of $\mathcal{X}_{Coh}$ is contextually coherent with the changed sentence, and thus may have a higher acceptance rate.

In some embodiments, the acceptance rate may further depend on language fluency in addition to contextual coherence. The language fluency is considered, so that fluency and readability of the rewritten text can be ensured. The language fluency score may be determined using the language model. For example, a language fluency score of the candidate edited version may be computed by formula (7):

$$\mathcal{X}_{LM}(y^*) = \prod_{i=1}^{N} P_{LM}(y_i^*|z, x', y_{<i}^*) \tag{7}$$

where $y^*$ represents the candidate edited version, $y_i^*$ represents an $i^{th}$ text element in the candidate edited version, $y_{<i}^*$ represents a text element before the $i^{th}$ text element in the candidate edited version, $z$ represents the S1 sentence 111, $x'$ represents the S'2 sentence 122, $P_{LM}$ represents a conditional probability obtained using any appropriate language model, and $\mathcal{X}_{LM}$ represents the language fluency score.

The term $P_{LM}(y_i^* | y_{<i}^*, x', z)$ in formula (7) represents a probability of occurrence of the $i^{th}$ text element when the S1 sentence 111, the S'2 sentence 122, and the text element before the $i^{th}$ text element are specified. A product of probabilities of occurrence of all text elements in the candidate edited version is used to represent the language fluency of the candidate edited version.

The contextual coherence and the language fluency may be regarded as expected attributes for text rewriting. In some embodiments, a steady-state distribution for text rewriting may be defined, and the steady-state distribution is related to various expected attributes and used to represent an overall attribute for text rewriting. For example, the steady-state distribution or the overall attribute may be defined as:

$$\pi(x) \propto \mathcal{X}_c^0(x) \ldots \mathcal{X}_c^n(x) \tag{8}$$

where x represents the candidate edited version, $\pi(x)$ represents the overall attribute of the candidate edited version, and $\mathcal{X}_c^0(x)$ and $\mathcal{X}_c^n(x)$ respectively represent a $0^{th}$ and $n^{th}$ expected attributes considered, for example, the language fluency and the contextual coherence.

Accordingly, when the language fluency and the contextual coherence are considered, the overall attribute may be defined as:

$$\pi(x) \propto \mathcal{X}_{LM}(x) \cdot \mathcal{X}_{Coh}(x) \tag{9}$$

where $\mathcal{X}_{LM}$ and $\mathcal{X}_{Coh}$ may be computed by formula (7) and formula (6), respectively. It can be learned that the steady-state distribution or the overall attribute may be defined as a product of the language fluency score and the contextual coherence score, that is, proportional to the language fluency score and the contextual coherence score.

In some embodiments, the acceptance rate may further depend on a transformation probability of generating the candidate edited version based on the ending part 105, in addition to attributes such as the contextual coherence and the language fluency. $X_{t+1}$ is used to represent the candidate edited version generated in the $t^{th}$ round of iteration. $x_t$ represents the current version of the ending part 105 at the beginning of the $t^{th}$ round of iteration. In this case, the transformation probability for the candidate edited version may be represented as $g(x_{t+1}|x_t)$.

For the replace operation, it is assumed that $x_t=[w_1, \ldots, w_m, \ldots, w_n]$, and the replace operation replaces a text element $w_m$ with $w^c$, the text element $w^c$ being obtained from a pre-selected candidate set $\mathcal{Q}$ through sampling. If $x_{t+1}=[w_1, \ldots, w^c, \ldots, w_n]$, a transformation probability $g_r$ for the replace operation may be defined as:

$$g_r(x_{t+1}|x_t) = \mathbb{1}(w^c \in \mathcal{Q}) \cdot P_{MLM}(w_m^* = w^c|x_{-m}) \tag{10}$$

where $\mathbb{1}(w^c \in \mathcal{Q})$ represents an indicator function, and has a value of 1 when $w^c \in \mathcal{Q}$, otherwise has a value of 0.

$$P_{MLM}(w_m^* = w^c|x_{-m})$$

represents a probability of occurrence of $w^c$ when other text elements than $w_m$ are specified.

$$P_{MLM}(w_m^* = w^c|x_{-m})$$

may be computed using a masked language model (MLM), for example, BERT.

$g_d$ may be used to represent a transformation probability for the delete operation. When and only when $$x_{t+1} = [w_1, \ldots, w_{m-1}, w_{m+1}, \ldots, w_n],\ g_d(x_{t+1}|x_t) = 1.$$

The insert operation includes two steps. First, a text element representing a mask is inserted to a determined position, that is, before or after the target text element 301. Then, a replace operation is performed on the inserted text element. Therefore, a transformation probability $g_i$ for the insert operation is similar to formula (10).

When the editing proposal module 320 randomly performs one of a replace operation, an insert operation, and a delete operation at a same probability, an expected transformation probability of generating a candidate edited version $x_{t+1}$ based on a current version $x_t$ is as the following formula:

$$g_r(x_{t+1}|x_t) = \frac{1}{3} \sum_{op \in \{r,d,i\}} g_{op}(x_{t+1}|x_t) \tag{11}$$

where $g_r$, $g_d$, and $g_i$ respectively correspond to the replace operation, the delete operation, and the insert operation, and are computed as described above.

In such embodiments, an acceptance rate $\propto$ of the candidate edited version can be determined based on the overall attribute and the transformation probability. For example, in the MCMC sampling process mentioned above, according to a Metropolis-Hasting (MH) sampling algorithm, a proposal distribution for generating the candidate edited version $x_{t+1}$ based on the current version $x_t$ is $g(x_{t+1}|x_t)$, and a sample distribution in MCMC sampling converges to the steady-state distribution $\pi(x)$. Accordingly, the acceptance rate of the candidate edited version $X_{t+1}$ generated in the $t^{th}$ round of iteration may be computed using the MH algorithm, as shown in the following formula:

$$\alpha(x_{t+1}|x_t) = \min\left\{1, \frac{\pi(x_{t+1})^{1/T} g(x_{t+1}|x_t)}{\pi(x_t)^{1/T} g(x_{t+1}|x_t)}\right\} \tag{12}$$

where T represents a temperature control coefficient. Merely as an example, $$T = 0.95^{\lfloor \frac{t}{5} \rfloor}.$$

The embodiments of the present disclosure are not limited in this respect.

The editing proposal module 320 determines, based on the acceptance rate $\propto$, whether the candidate edited version is accepted. In some embodiments, if the acceptance rate $\propto$ is greater than a threshold acceptance rate, the candidate edited version is accepted, that is, determined as one of the edited versions 303. In some embodiments, a random number may be generated, and if the generated random number is less than the acceptance rate $\propto$, the candidate edited version is accepted.

Version Selection

As mentioned above with reference to FIG. 3, the target version determining module 340 may select the target version for replacing the ending part 105 from the plurality of edited versions 303 based on the attribute of each of the plurality of edited versions 303. An edited version 303 with an optimal attribute may be selected as the target version. For example, the target version may be selected based on the overall attribute $\pi(x)$ computed by formula (8) or formula (9), where x represents the edited version 303.

In some embodiments, if the overall attribute $\pi(x)$ of the candidate edited version has been computed when the acceptance rate is computed, the overall attribute computed before may be directly used. In some embodiments, the target version determining module 340 may compute the overall attribute $\pi(x)$ according to formula (6), formula (7), and formula (8). In this case, the parameters described for the candidate edited version in these formulas are replaced with the edited version.

Figure 5:
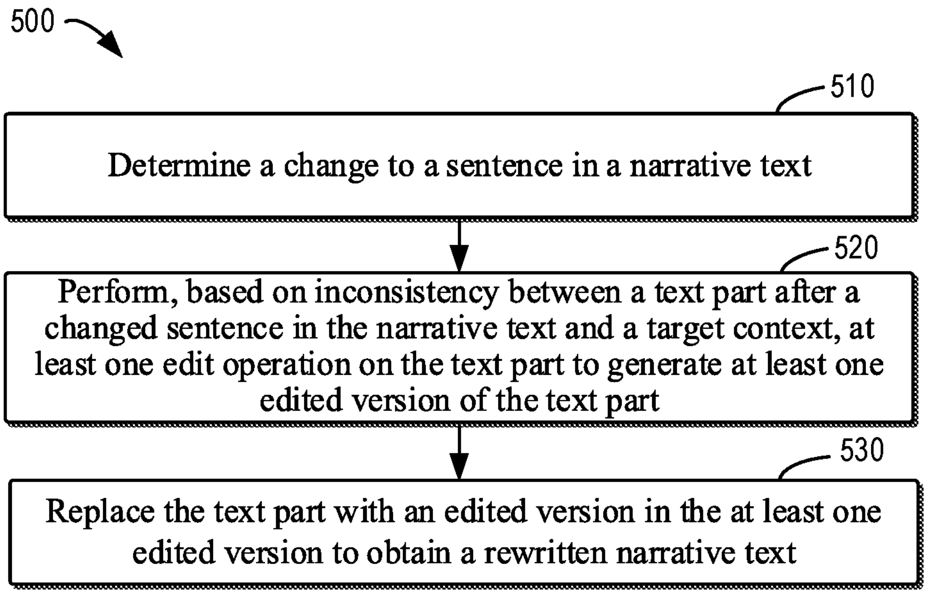
FIG. 5 is a flowchart of a narrative text rewriting process according to some embodiments of the present disclosure.

The target version determining module 340 may rank the plurality of edited versions 303 based on the overall attributes $\pi(x)$, and select the edited version ranked highest as the target version. $\pi$ Example Process FIG. 5 is a flowchart of a narrative text rewriting process 500 according to some embodiments of the present disclosure. The process 500 may be implemented at the rewriting system 100.

At block 510, a change to a sentence in a narrative text is determined. An initial context of the sentence before the change is different from a target context of a changed sentence. For example, the rewriting system 101 receives the narrative text 101 and the changed S'2 sentence 122.

At block 520, at least one edit operation is performed, based on inconsistency between a text part after the changed sentence in the narrative text and the target context, on the text part to generate at least one edited version of the text part. For example, the rewriting system 101 performs an edit operation on the ending part 105 based on inconsistency between the ending part 105 and a context of the changed S'2 sentence 122, to obtain at least one edited version of the ending part 105.

In some embodiments, when the at least one edit operation is performed on the text part to generate the at least one edited version, conflict detection and editing proposal may be iteratively performed. Specifically, the following operations may be iteratively performed: determining a causal conflict degree between each of a plurality of text elements in the text part and the target context; selecting a target text element from the plurality of text elements based on the conflict degree of each of the plurality of text elements, the conflict degree of the target text element being higher than that of a text element not selected from the plurality of text elements; and performing a candidate edit operation on the target text element to generate one of the at least one edited version.

In some embodiments, when one of the at least one edited version is generated, contextual coherence of a candidate edited version generated by performing the candidate edit operation on the target text element may be considered. Specifically, a causal contextual coherence score of the candidate edited version may be determined based on a correlation between the candidate edited version of the text part and the target context and a correlation between the candidate edited version and the initial context. For example, the contextual coherence score is computed by formula (6) using a language model. An acceptance rate of the candidate edited version may be determined at least based on the contextual coherence score, the acceptance rate indicating a probability that the candidate edited version is accepted. If the acceptance rate exceeds a threshold acceptance rate, the candidate edited version may be determined as one of the at least one edited version.

In some embodiments, the acceptance rate of the candidate edited version may further be determined based on another factor. Specifically, a language fluency score of the candidate edited version may be determined based on a probability of occurrence of each text element in the candidate edited version in the target context. For example, the language coherence score may be computed by formula (7) using the language model. A transformation probability of generating the candidate edited version based on the text part may be determined. For example, the transformation probability may be computed by formula (11). The acceptance rate may be determined based on the contextual coherence score, the language fluency score, and the transformation probability. For example, the acceptance rate may be computed by formula (12).

In some embodiments, when the conflict degree of each of the plurality of text elements is determined, correlations with the target context and with the initial context may be considered. Specifically, for a corresponding text element in the plurality of text elements, a first correlation between the corresponding text element and the target context and a second correlation between the corresponding text element and the initial context may be determined using the language model. The conflict degree of the corresponding text element is determined based on the first correlation and the second correlation. For example, the conflict degree may be computed by formula (5) using the language model.

At block 530, the text part is replaced with an edited version in the at least one edited version to obtain a rewritten narrative text. For example, when there are a plurality of edited versions 303, one of the plurality of edited versions 303 is selected to replace the ending part 105.

In some embodiments, a target version for replacement is selected based on an attribute of each of the at least one edited version. Specifically, a causal contextual coherence score of each of the at least one edited version may be determined based on a correlation between each of the at least one edited version and the target context and a correlation between each of the at least one edited version and the initial context. An attribute of each of the at least one edited version that is proportional to the contextual coherence score may be determined. The target version may be selected from the at least one edited version based on the attribute of each of the at least one edited version, the attribute of the target version being better than that of a version not selected from the at least one edited version. The text part may be replaced with the target version to obtain the rewritten narrative text.

In some embodiments, the attribute of each of the at least one edited version is also proportional to a language fluency score, for example, as shown in formula (9). The language fluency score of each of the at least one edited version may be determined based on a probability of occurrence of each text element in the at least one edited version in the target context.

Example Apparatus and Device

Figure 6:
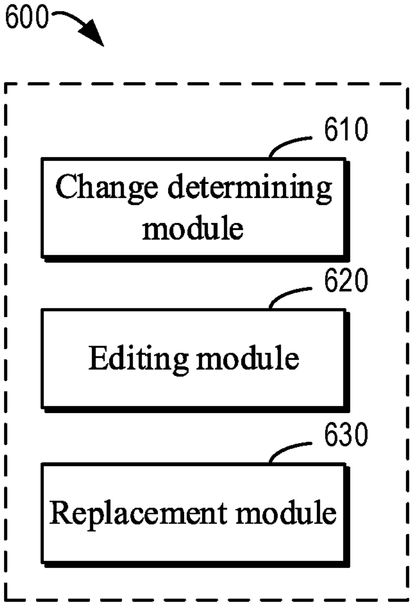
FIG. 6 is a block diagram of an apparatus for rewriting a narrative text according to some embodiments of the present disclosure.

FIG. 6 is a block diagram of an apparatus 600 for rewriting a narrative text according to some embodiments of the present disclosure. The apparatus 600 may be implemented as or included in the rewriting system 110. Each module/component in the apparatus 600 may be implemented by hardware, software, firmware, or any combination thereof.

As shown in the figure, the apparatus 600 includes a change determining module 610 configured to determine a change to a sentence in a narrative text, an initial context of the sentence before the change being different from a target context of a changed sentence. The apparatus 600 further includes an editing module 620 configured to perform, based on inconsistency between a text part after the sentence in the narrative text and the target context, at least one edit operation on the text part to generate at least one edited version of the text part. The apparatus 600 further includes a replacement module 630 configured to replace the text part with an edited version in the at least one edited version to obtain a rewritten narrative text.

In some embodiments, the editing module 620 includes: a conflict degree determining module configured to determine a causal conflict degree between each of a plurality of text elements in the text part and the target context; a target text element selection module configured to select a target text element from the plurality of text elements based on the conflict degree of each of the plurality of text elements, the conflict degree of the target text element being higher than that of a text element not selected from the plurality of text elements; and an editing execution module configured to perform a candidate edit operation on the target text element to generate one of the at least one edited version. The operations of the conflict degree determining module, the target text element selection module, and the editing execution module are iteratively performed.

In some embodiments, the conflict degree determining module includes: a correlation determining module configured to: for a corresponding text element in the plurality of text elements, determine, using a language model, a first correlation between the corresponding text element and the target context and a second correlation between the corresponding text element and the initial context; and a correlation using module configured to determine the conflict degree of the corresponding text element based on the first correlation and the second correlation.

In some embodiments, the editing execution module includes: a coherence score module configured to determine, based on a correlation between a candidate edited version of the text part and the target context and a correlation between the candidate edited version and the initial context, a causal contextual coherence score of the candidate edited version, the candidate edited version being generated by performing the candidate edit operation on the target text element; an acceptance rate determining module configured to determine an acceptance rate of the candidate edited version at least based on the contextual coherence score, the acceptance rate indicating a probability that the candidate edited version is accepted; and an acceptance rate judgment module configured to: if the acceptance rate exceeds a threshold acceptance rate, determine the candidate edited version as one of the at least one edited version.

In some embodiments, the acceptance rate determining module is further configured to: determine a language fluency score of the candidate edited version based on a probability of occurrence of each text element in the candidate edited version in the target context; determine a transformation probability of generating the candidate edited version based on the text part; and determine the acceptance rate based on the contextual coherence score, the language fluency score, and the transformation probability.

In some embodiments, the replacement module 630 includes: a coherence score module configured to determine, based on a correlation between each of the at least one edited version and the target context and a correlation between each of the at least one edited version and the initial context, a causal contextual coherence score of each of the at least one edited version; an attribute determining module configured to determine an attribute of each of the at least one edited version that is proportional to the contextual coherence score; a target version selection module configured to select a target version from the at least one edited version based on the attribute of each of the at least one edited version, the attribute of the target version being better than that of a version not selected from the at least one edited version; and a text part replacement module configured to replace the text part with the target version to obtain the rewritten narrative text.

In some embodiments, the apparatus 600 further includes a fluency score module configured to determine a language fluency score of each of the at least one edited version based on a probability of occurrence of each text element in the at least one edited version under the target context, where the attribute of each of the at least one edited version is also proportional to the language fluency score.

Figure 7:
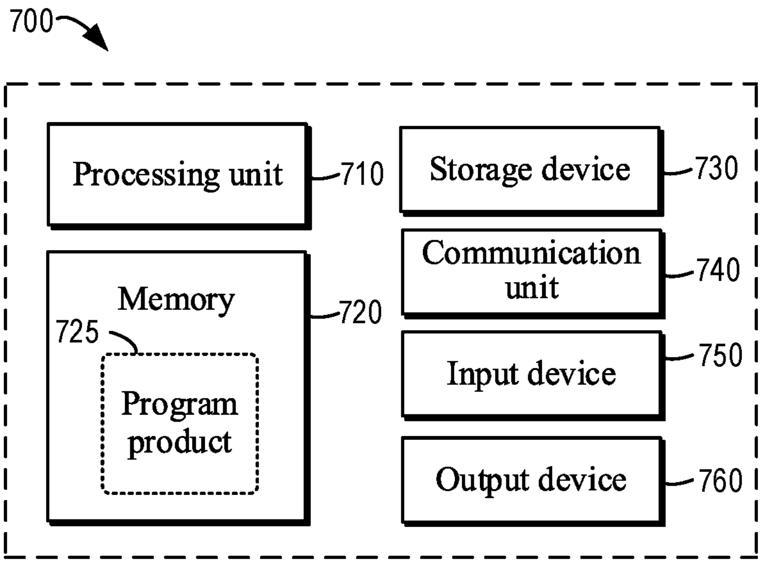
FIG. 7 is a block diagram of a device capable of implementing a plurality of embodiments of the present disclosure.

FIG. 7 is a block diagram of a computing device 700 capable of implementing one or more embodiments of the present disclosure. It should be understood that the computing device 700 shown in FIG. 7 is merely an example and should not constitute any limitation on the functions and scope of the embodiments described herein. The computing device 700 shown in FIG. 7 may be configured to implement the rewriting system 101 in FIG. 1.

As shown in FIG. 7, the computing device 700 is in a form of a general-purpose computing device. Components of the computing device 700 may include but are not limited to one or more processors or processing units 710, a memory 720, a storage device 730, one or more communication units 740, one or more input devices 750, and one or more output devices 760. The processing unit 710 may be a physical or virtual processor, and can perform various processing based on a program stored in the memory 720. In a multi-processor system, a plurality of processing units perform computer-executable instructions in parallel, to improve a parallel processing capability of the computing device 800.

The computing device 700 generally includes a plurality of computer storage media. Such media may be any available media accessible by the computing device 700, including, but not limited to, volatile and non-volatile media and removable and non-removable media. The memory 720 may be a volatile memory (for example, a register, a cache, or a random access memory (RAM)), a non-volatile memory (for example, a read-only memory (ROM), an electrically erasable programmable read-only memory (EEPROM), or a flash memory), or a specific combination thereof. The storage device 730 may be a removable or non-removable medium, may include a machine-readable medium, for example, a flash drive, a disk, or any other medium, and may be configured to store information and/or data (for example, training data for training) and accessed in the computing device 700.

The computing device 700 may further include other removable/non-removable and volatile/non-volatile storage media. Although not shown in FIG. 7, a disk drive for reading from or writing into removable and non-volatile disks (for example, a "floppy disk") and an optical disk drive for reading from or writing into removable and non-volatile optical disks may be provided. In these cases, each drive may be connected to a bus (not shown) through one or more data medium interfaces. The memory 720 may include a computer program product 725 having one or more program modules that are configured to perform various methods or actions in various embodiments of the present disclosure.

The communication unit 740 implements communication with another computing device through a communication medium. In addition, functions of the components of the computing device 700 may be implemented by a single computing cluster or a plurality of computing machines, and these computing machines can communicate through a communication connection. Therefore, the computing device 700 may perform operations in a networked environment through a logical connection to one or more other servers, a network personal computer (PC), or another network node.

The input device 750 may be one or more input devices, such as a mouse, a keyboard, and a trackball. The output device 760 may be one or more output devices, such as a display, a speaker, and a printer. The computing device 700 may further communicate, through the communication unit 740 as required, with one or more external devices (not shown), for example, a storage device and a display device, with one or more devices enabling a user to interact with the computing device 700, or with any device (for example, a network interface card or a modem) enabling the computing device 700 to communicate with one or more other computing devices. Such communication may be performed through an input/output (I/O) interface (not shown).

According to an exemplary implementation of the present disclosure, there is provided a computer-readable storage medium. The computer-readable storage medium having computer-executable instructions stored thereon. The computer-executable instructions are executed by a processor to implement the method described above. According to an exemplary implementation of the present disclosure, there is further provided a computer program product. The computer program product is tangibly stored on a non-transitory computer-readable medium, and includes computer-executable instructions. The computer-executable instructions are executed by a processor to implement the method described above.

Various aspects of the present disclosure are described here with reference to the flowcharts and/or the block diagrams of the method, the apparatus, the device, and the computer program product implemented according to the present disclosure. It should be understood that each block of the flowcharts and/or the block diagrams and a combination of blocks in the flowcharts and/or the block diagrams may be implemented by computer-readable program instructions.

These computer-readable program instructions may be provided to a processing unit of a general-purpose computer, a special-purpose computer, or another programmable data processing apparatus to produce a machine, such that the instructions, when executed by the processing unit of the computer or the another programmable data processing apparatus, create an apparatus for implementing functions/actions specified in one or more blocks in the flowcharts and/or the block diagrams. These computer-readable program instructions may alternatively be stored in the computer-readable storage medium. These instructions enable a computer, a programmable data processing apparatus, and/or another device to work in a specific manner. Therefore, the computer-readable medium storing the instructions includes an artifact that includes instructions for implementing various aspects of functions/actions specified in one or more blocks in the flowcharts and/or the block diagrams.

The computer-readable program instructions may be loaded onto a computer, another programmable data processing apparatus, or another device, such that a series of operation steps are performed on the computer, the another programmable data processing apparatus, or the another device to produce a computer-implemented process. Therefore, the instructions executed on the computer, the another programmable data processing apparatus, or the another device implement functions/actions specified in one or more blocks in the flowcharts and/or the block diagrams.

The flowcharts and the block diagrams in the accompanying drawings illustrate possible system architectures, functions, and operations of the system, the method, and the computer program product according to a plurality of implementations of the present disclosure. In this regard, each block in the flowcharts or the block diagrams may represent a part of a module, a program segment, or an instruction. The part of the module, the program segment, or the instruction includes one or more executable instructions for implementing a specified logical function. In some alternative implementations, functions marked in the blocks may occur in a sequence different from that marked in the accompanying drawings. For example, two consecutive blocks may actually be executed substantially in parallel, or may sometimes be executed in a reverse order, depending on a function involved. It should also be noted that each block in the block diagram and/or the flowchart, and a combination of the blocks in the block diagram and/or the flowchart may be implemented by a dedicated hardware-based system that executes specified functions or actions, or may be implemented by a combination of dedicated hardware and computer instructions.

The foregoing has described various implementations of the present disclosure. The foregoing descriptions are exemplary, not exhaustive, and are not limited to the disclosed implementations. Many modifications and variations are apparent to a person of ordinary skill in the art without departing from the scope and spirit of the described implementations. Selection of terms used in this specification is intended to best explain principles of the implementations, actual application, or improvements to technologies in the market, or to enable another person of ordinary skill in the art to understand the implementations disclosed in this specification.

The invention claimed is:

1. A method for rewriting a narrative text, the method comprising:

determining a change to a sentence in the narrative text, wherein an initial context of the sentence before the change is different from a target context of a changed sentence;

performing, based on inconsistency between a text part after the sentence in the narrative text and the target context, at least one edit operation on the text part to generate at least one edited version of the text part; and replacing the text part with one of the at least one edited version to obtain a rewritten narrative text, wherein generating the at least one edited version comprises:

determining, based on a correlation between a candidate edited version of the text part and the target context and a correlation between the candidate edited version and the initial context, a causal contextual coherence score of the candidate edited version, determining an acceptance rate of the candidate edited version at least based on the causal contextual coherence score, the acceptance rate indicating a probability that the candidate edited version is accepted, wherein determining the acceptance rate of the candidate edited version comprises:

determining a language fluency score of the candidate edited version based on a probability of occurrence of each text element in the candidate edited version in the target context, determining a transformation probability of generating the candidate edited version based on the text part, and determining the acceptance rate based on the causal contextual coherence score, the language fluency score, and the transformation probability.

2. The method according to claim 1, wherein performing the at least one edit operation on the text part to generate the at least one edited version comprises iteratively performing the following operations:

determining a causal conflict degree between each of a plurality of text elements in the text part and the target context;

selecting a target text element from the plurality of text elements based on the causal conflict degree of each of the plurality of text elements, the causal conflict degree of the target text element being higher than that of a text element not selected from the plurality of text elements; and performing a candidate edit operation on the target text element to generate one of the at least one edited version.

3. The method according to claim 2, wherein determining the causal conflict degree of each of the plurality of text elements comprises:

for a corresponding text element in the plurality of text elements, determining a first correlation between the corresponding text element and the target context and a second correlation between the corresponding text element and the initial context using a language model; and determining the causal conflict degree of the corresponding text element based on the first correlation and the second correlation.

4. The method according to claim 2, wherein when the acceptance rate of the candidate edited version exceeds a threshold acceptance rate, identifying the candidate edited version as an edited version among the at least one edited version.

5. The method according to claim 1, wherein replacing the text part with the one of the at least one edited version to obtain the rewritten narrative text comprises:

determining a causal contextual coherence score of each of the at least one edited version based on a correlation between each of the at least one edited version and the target context and a correlation between each of the at least one edited version and the initial context;

determining an attribute of each of the at least one edited version that is proportional to the causal contextual coherence score;

selecting a target version from the at least one edited version based on the attribute of each of the at least one edited version, the attribute of the target version being better than that of a version not selected from the at least one edited version; and replacing the text part with the target version to obtain the rewritten narrative text.

6. The method according to claim 5, further comprising:

determining a language fluency score of each of the at least one edited version based on a probability of occurrence of each text element in the at least one edited version in the target context, wherein the attribute of each of the at least one edited version is also proportional to the language fluency score.

7. An electronic device, comprising:

at least one processing unit; and at least one memory, wherein the at least one memory is coupled to the at least one processing unit, and stores instructions executable by the at least one processing unit, and the instructions, when executed by the at least one processing unit, cause the electronic device to perform actions comprising:

determining a change to a sentence in a narrative text, wherein an initial context of the sentence before the change is different from a target context of a changed sentence;

performing, based on inconsistency between a text part after the sentence in the narrative text and the target context, at least one edit operation on the text part to generate at least one edited version of the text part; and replacing the text part with one of the at least one edited version to obtain a rewritten narrative text, wherein generating the at least one edited version comprises:

determining, based on a correlation between a candidate edited version of the text part and the target context and a correlation between the candidate edited version and the initial context, a causal contextual coherence score of the candidate edited version, determining an acceptance rate of the candidate edited version at least based on the causal contextual coherence score, the acceptance rate indicating a probability that the candidate edited version is accepted, wherein determining the acceptance rate of the candidate edited version comprises:

determining a language fluency score of the candidate edited version based on a probability of occurrence of each text element in the candidate edited version in the target context, determining a transformation probability of generating the candidate edited version based on the text part, and determining the acceptance rate based on the causal contextual coherence score, the language fluency score, and the transformation probability.

8. The electronic device according to claim 7, wherein performing the at least one edit operation on the text part to generate the at least one edited version comprises iteratively performing the following operations:

determining a causal conflict degree between each of a plurality of text elements in the text part and the target context;

selecting a target text element from the plurality of text elements based on the causal conflict degree of each of the plurality of text elements, the causal conflict degree of the target text element being higher than that of a text element not selected from the plurality of text elements; and performing a candidate edit operation on the target text element to generate one of the at least one edited version.

9. The electronic device according to claim 8, wherein determining the causal conflict degree of each of the plurality of text elements comprises:

for a corresponding text element in the plurality of text elements, determining a first correlation between the corresponding text element and the target context and a second correlation between the corresponding text element and the initial context using a language model; and determining the causal conflict degree of the corresponding text element based on the first correlation and the second correlation.

10. The electronic device according to claim 8, wherein when the acceptance rate of the candidate edited version exceeds a threshold acceptance rate, identifying the candidate edited version as an edited version among the at least one edited version.

11. The electronic device according to claim 7, wherein replacing the text part with the one of the at least one edited version to obtain the rewritten narrative text comprises:

determining a causal contextual coherence score of each of the at least one edited version based on a correlation between each of the at least one edited version and the target context and a correlation between each of the at least one edited version and the initial context;

determining an attribute of each of the at least one edited version that is proportional to the causal contextual coherence score;

selecting a target version from the at least one edited version based on the attribute of each of the at least one edited version, the attribute of the target version being better than that of a version not selected from the at least one edited version; and replacing the text part with the target version to obtain the rewritten narrative text.

12. The electronic device according to claim 11, wherein the actions further comprise:

determining a language fluency score of each of the at least one edited version based on a probability of occurrence of each text element in the at least one edited version in the target context, wherein the attribute of each of the at least one edited version is also proportional to the language fluency score.

13. A non-transitory computer-readable storage medium having a computer program stored thereon, wherein the program, when executed by a processor, causes the processor to implement operations, the operations comprising:

determining a change to a sentence in a narrative text, wherein an initial context of the sentence before the change is different from a target context of a changed sentence;

performing, based on inconsistency between a text part after the sentence in the narrative text and the target context, at least one edit operation on the text part to generate at least one edited version of the text part; and replacing the text part with one of the at least one edited version to obtain a rewritten narrative text, wherein generating the at least one edited version comprises:

determining, based on a correlation between a candidate edited version of the text part and the target context and a correlation between the candidate edited version and the initial context, a causal contextual coherence score of the candidate edited version, determining an acceptance rate of the candidate edited version at least based on the causal contextual coherence score, the acceptance rate indicating a probability that the candidate edited version is accepted, wherein determining the acceptance rate of the candidate edited version comprises:

determining a language fluency score of the candidate edited version based on a probability of occurrence of each text element in the candidate edited version in the target context, determining a transformation probability of generating the candidate edited version based on the text part, and determining the acceptance rate based on the causal contextual coherence score, the language fluency score, and the transformation probability.

14. The non-transitory computer-readable storage medium according to claim 13, wherein performing the at least one edit operation on the text part to generate the at least one edited version comprises iteratively performing the following operations:

determining a causal conflict degree between each of a plurality of text elements in the text part and the target context;

selecting a target text element from the plurality of text elements based on the causal conflict degree of each of the plurality of text elements, the causal conflict degree of the target text element being higher than that of a text element not selected from the plurality of text elements; and performing a candidate edit operation on the target text element to generate one of the at least one edited version.

15. The non-transitory computer-readable storage medium according to claim 14, wherein determining the causal conflict degree of each of the plurality of text elements comprises:

for a corresponding text element in the plurality of text elements, determining a first correlation between the corresponding text element and the target context and a second correlation between the corresponding text element and the initial context using a language model; and determining the causal conflict degree of the corresponding text element based on the first correlation and the second correlation.

16. The non-transitory computer-readable storage medium according to claim 14, wherein when the acceptance rate of the candidate edited version exceeds a threshold acceptance rate, identifying the candidate edited version as an edited version among the at least one edited version.

17. The non-transitory computer-readable storage medium according to claim 13, wherein replacing the text part with the one of the at least one edited version to obtain the rewritten narrative text comprises:

determining a causal contextual coherence score of each of the at least one edited version based on a correlation between each of the at least one edited version and the target context and a correlation between each of the at least one edited version and the initial context;

determining an attribute of each of the at least one edited version that is proportional to the causal contextual coherence score;

selecting a target version from the at least one edited version based on the attribute of each of the at least one edited version, the attribute of the target version being better than that of a version not selected from the at least one edited version; and replacing the text part with the target version to obtain the rewritten narrative text.

18. The non-transitory computer-readable storage medium according to claim 17, wherein the operations further comprise:

determining a language fluency score of each of the at least one edited version based on a probability of occurrence of each text element in the at least one edited version in the target context, wherein the attribute of each of the at least one edited version is also proportional to the language fluency score.

* * * * *